United States Patent
Huang

(10) Patent No.: US 9,393,585 B2
(45) Date of Patent: Jul. 19, 2016

(54) ADHESIVE COATING DEVICE WITH DISCHARGE ADJUSTMENT MECHANISM

(71) Applicant: Yu-Cheng Huang, Changhua (TW)

(72) Inventor: Yu-Cheng Huang, Changhua (TW)

( * ) Notice: Subject to any disclaimer, the term of this patent is extended or adjusted under 35 U.S.C. 154(b) by 125 days.

(21) Appl. No.: 14/533,137

(22) Filed: Nov. 5, 2014

(65) Prior Publication Data

US 2015/0053132 A1 Feb. 26, 2015

(51) Int. Cl.
| | |
|---|---|
| *B05C 11/00* | (2006.01) |
| *B05C 1/02* | (2006.01) |
| *B05C 1/08* | (2006.01) |
| *A43D 11/03* | (2006.01) |
| *A43D 25/18* | (2006.01) |
| *B05C 21/00* | (2006.01) |
| *B27G 11/00* | (2006.01) |
| *C09J 5/00* | (2006.01) |
| *B05D 5/10* | (2006.01) |

(52) U.S. Cl.
CPC ............... *B05C 1/025* (2013.01); *A43D 11/03* (2013.01); *A43D 25/181* (2013.01); *B05C 1/083* (2013.01); *B05C 1/0813* (2013.01); *B05C 1/0817* (2013.01); *B05C 1/02* (2013.01); *B05C 11/00* (2013.01); *B05C 21/00* (2013.01); *B05D 5/10* (2013.01); *B27G 11/00* (2013.01); *C09J 5/00* (2013.01)

(58) Field of Classification Search
CPC .... B05C 1/025; B05C 1/0813; B05C 1/0817; B05C 1/083; B05C 1/02; B05C 11/00; A43D 25/181; A43D 11/03; B27G 11/00; B05D 5/10
USPC ................ 118/217, 225, 249, 255, 261, 262; 427/207.1, 428.14
See application file for complete search history.

(56) References Cited

U.S. PATENT DOCUMENTS

| | | | | |
|---|---|---|---|---|
| 3,057,282 A | * | 10/1962 | Luboshez | D06B 1/146 101/363 |
| 4,357,896 A | * | 11/1982 | Feldkamper | B05C 1/0813 118/249 |
| 5,549,751 A | * | 8/1996 | Brinkmeier | B05C 1/0813 118/216 |

* cited by examiner

Primary Examiner — Laura Edwards

(57) ABSTRACT

An adhesive coating device is provided with an adhesive reservoir; two opposite adjustment rollers at bottom of the reservoir; a pattern roller between the adjustment rollers and having a pattern formed thereon; a resilient roller under the pattern roller; a roller member under the resilient roller; two pivotal, co-rotated links on a side of the reservoir and operatively connected to the adjustment rollers respectively; and a spring biased adjustment screw pivotably secured to an end of one link. Clockwise rotation of the adjustment screw rotates the links at different directions, thereby decreasing a gap between the pattern roller and each adjustment roller.

1 Claim, 11 Drawing Sheets

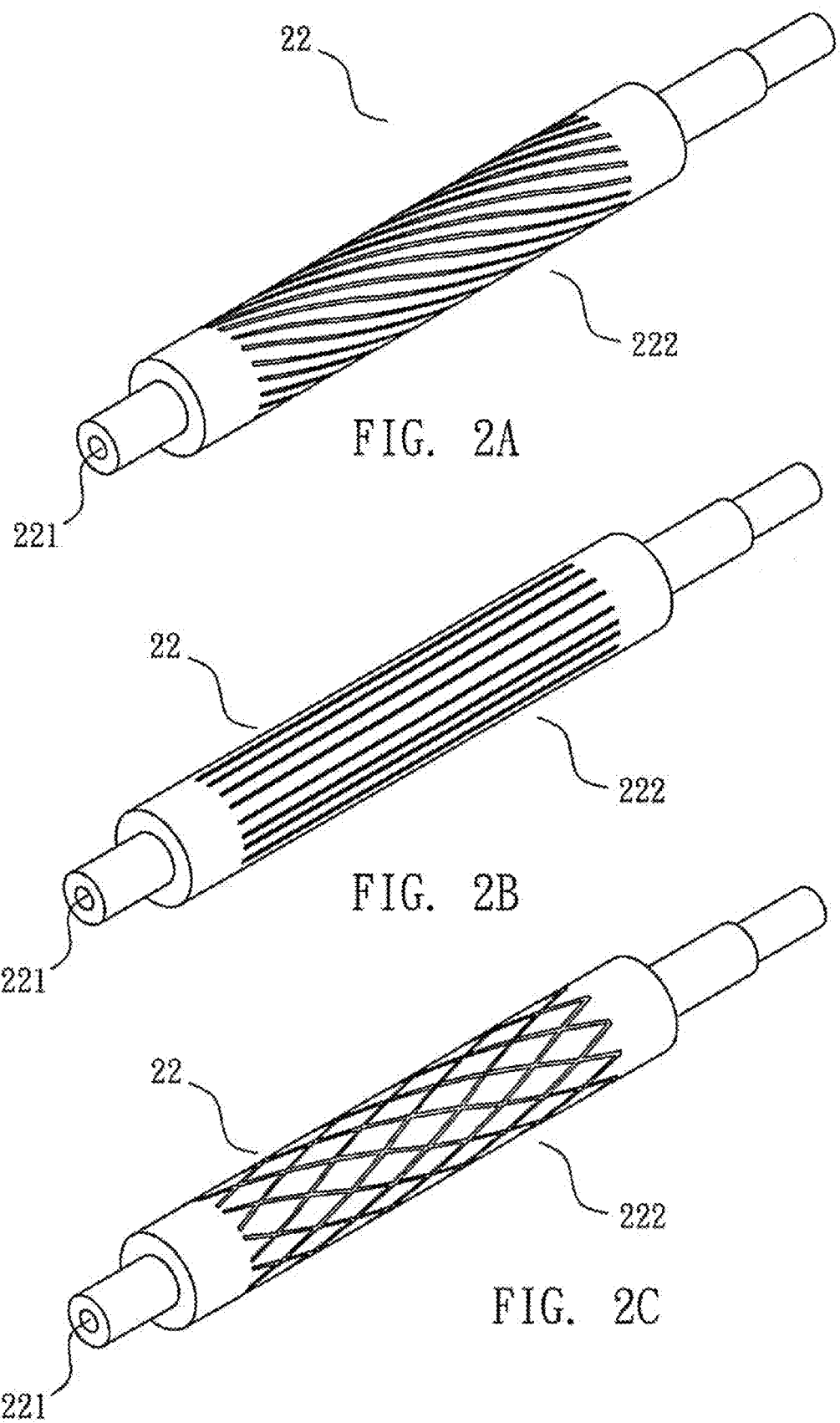

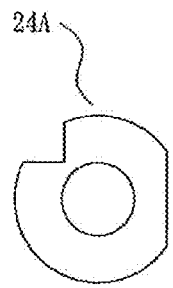
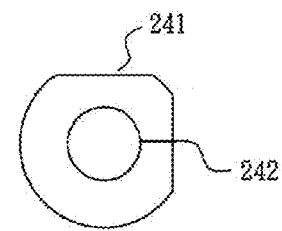
FIG.3B    FIG.3C
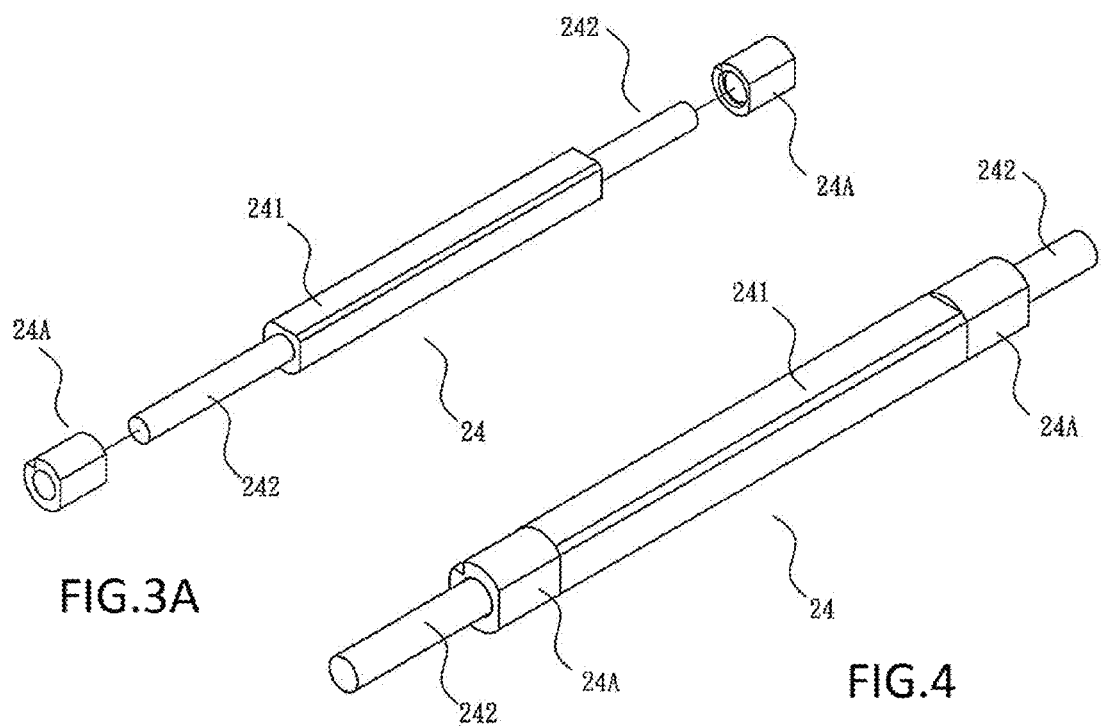
FIG.3A    FIG.4

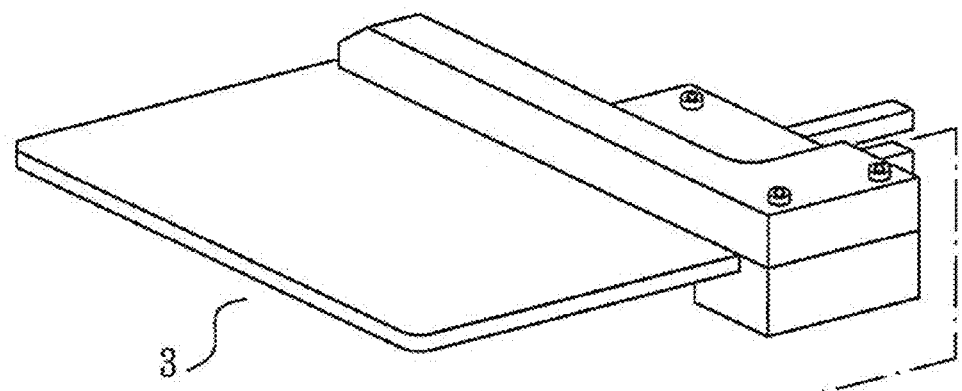
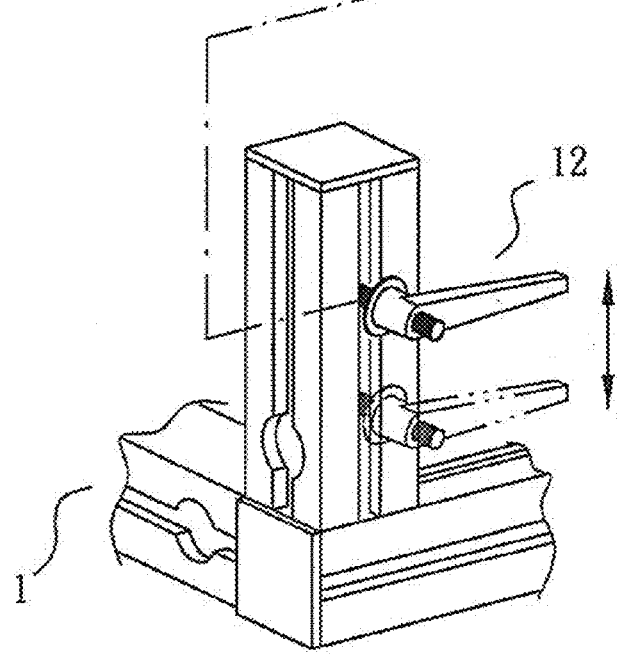
FIG. 5
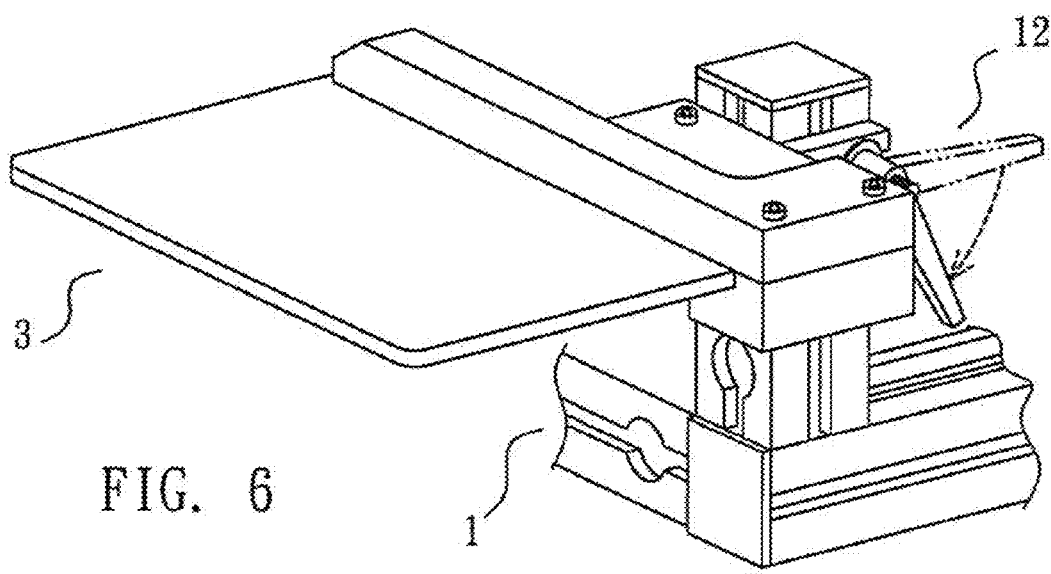
FIG. 6

ADHESIVE COATING DEVICE WITH DISCHARGE ADJUSTMENT MECHANISM

BACKGROUND OF THE INVENTION

1. Field of the Invention

The invention relates to adhesive coating devices and more particularly to an adhesive coating device having a mechanism for adjusting amount of applied adhesive.

2. Description of Related Art

Adhesive coating devices are well known in the art. However, these conventional adhesive coating devices are not provided with a mechanism for adjusting amount of applied adhesive. Thus, an outer layer having a preset thickness can be formed on a surface of an article using the conventional adhesive coating device. Thus, the need for improvement still exists.

SUMMARY OF THE INVENTION

It is therefore one object of the invention to provide an adhesive coating device comprising a reservoir for containing a quantity of adhesive; opposite first and second adjustment rollers disposed at a bottom of the reservoir; a pattern roller disposed between and spaced apart from the first and second adjustment rollers and having a predetermined pattern formed thereon; a resilient roller disposed under the pattern roller; a roller member disposed under the resilient roller; pivotal, co-rotated first and second links disposed on a side of the reservoir and operatively connected to the first and second adjustment rollers respectively; a spring biased adjustment screw having a bottom end pivotably secured to an end of the first link; and each of the first and second adjustment rollers includes a scraping member, a shaft through the scraping member, and two limit members put on the shaft and mounted on two ends of the scraping member respectively; wherein the adhesive in the reservoir is configured to flow through both a first gap between the first adjustment roller and the pattern roller and a second gap between the second adjustment roller and the pattern roller to spread on the pattern roller, the adhesive is brought from the pattern roller to the resilient roller with the predetermined pattern being printed on the adhesive on the resilient roller, and the adhesive is spread on a workpiece passing through a gap between the resilient roller and the roller member; and wherein a clockwise rotation of the adjustment screw rotates the first link an angle and rotates the second link the same angle but at a different direction, thereby decreasing a gap between the pattern roller and each of the first and second adjustment rollers.

The above and other objects, features and advantages of the invention will become apparent from the following detailed description taken with the accompanying drawings.

BRIEF DESCRIPTION OF THE DRAWINGS

FIG. 2A is a perspective view of a first preferred embodiment of the pattern roller;

FIG. 2B is a perspective view of a second preferred embodiment of the pattern roller;

FIG. 2C is a perspective view of a third preferred embodiment of the pattern roller;

FIG. 3A is an exploded view of the adjustment roller;

FIG. 3B is a front view of the limit member;

FIG. 3C is a front view of the scraping member and the shaft;

FIG. 4 is a perspective view of the assembled adjustment roller;

FIG. 5 is a perspective view of the support plate and a portion of the machine and prior to putting together;

FIG. 6 is a perspective view of the assembled support plate of FIG. 5;

DETAILED DESCRIPTION OF THE INVENTION

Figure 1:
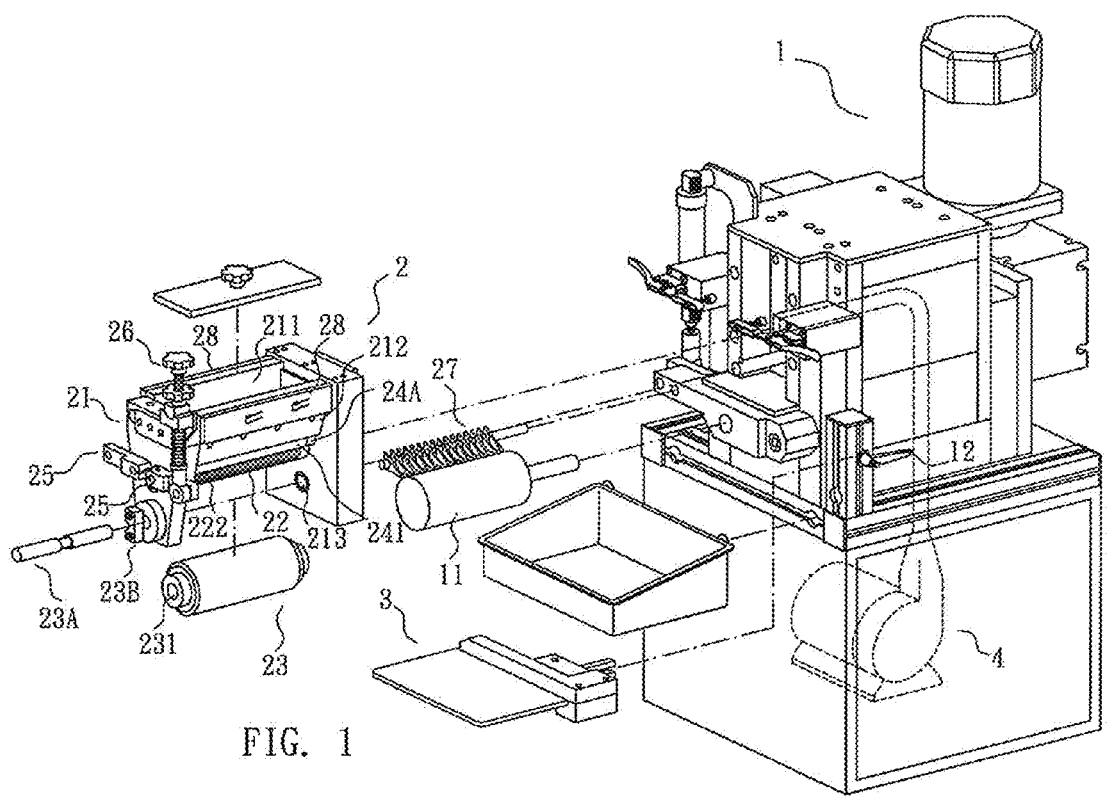
FIG. 1 is an exploded, perspective view of an adhesive coating device according to the invention mounted on a machine.
Figure 7:
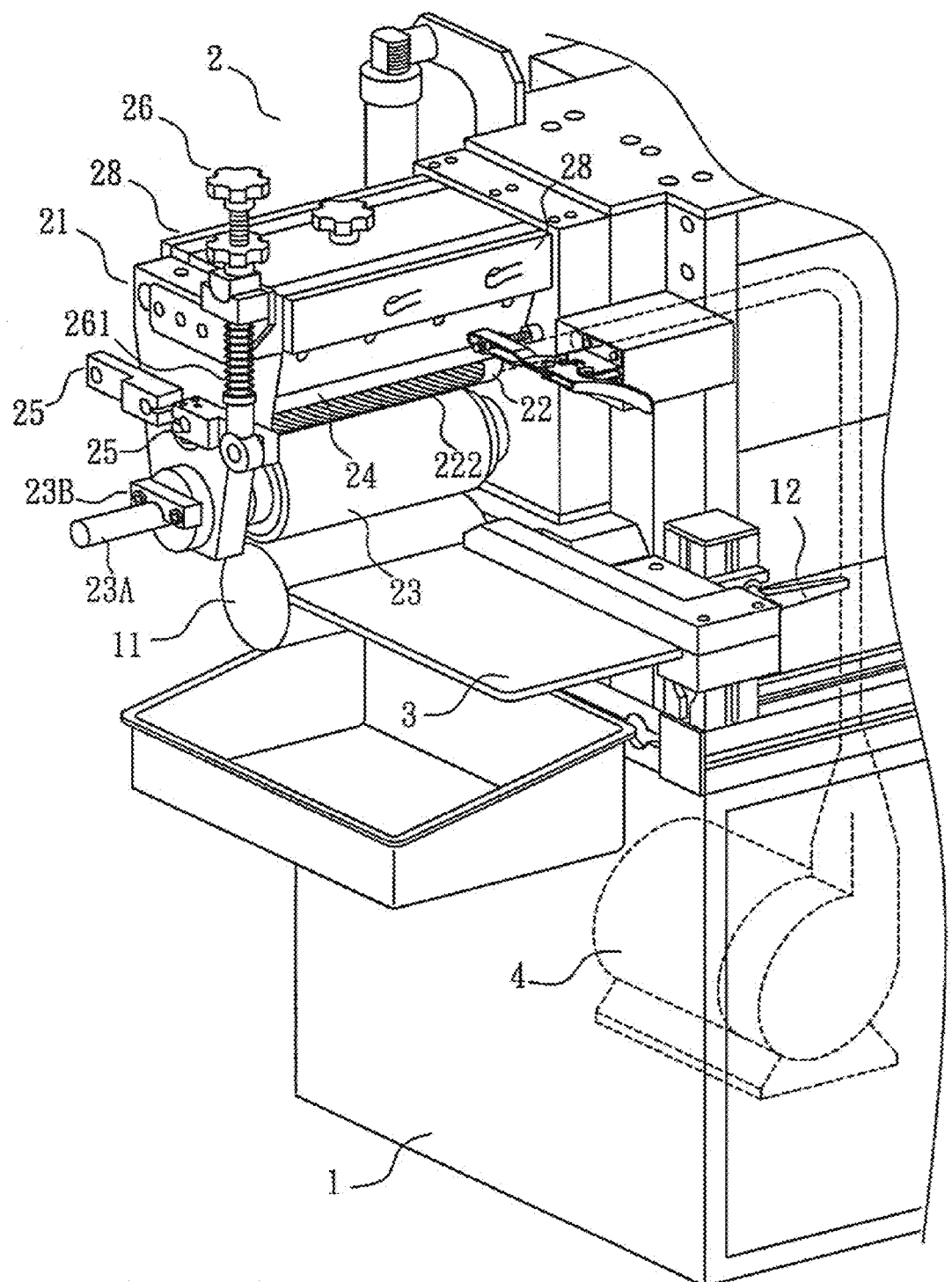
FIG. 7 is a perspective view of the assembled machine and the adhesive coating device.
Figure 9:
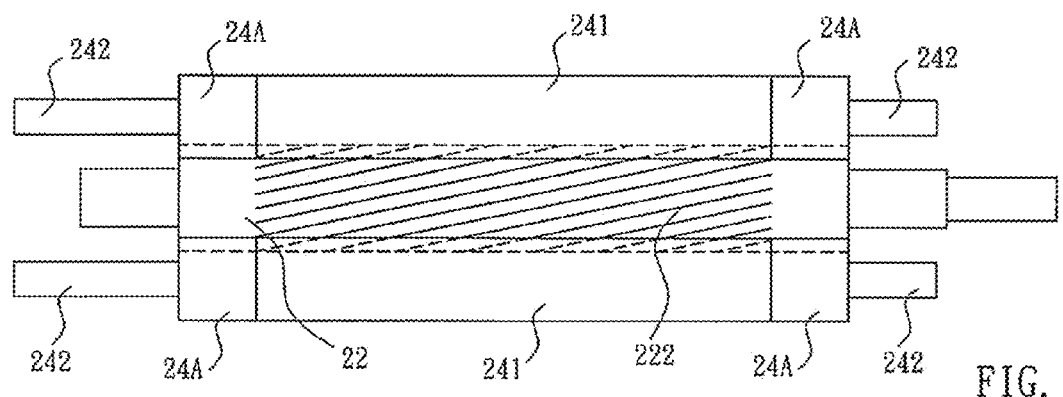
FIG. 9 is a side elevation of the pattern roller, the adjustment roller, and the resilient roller.
Figure 8:
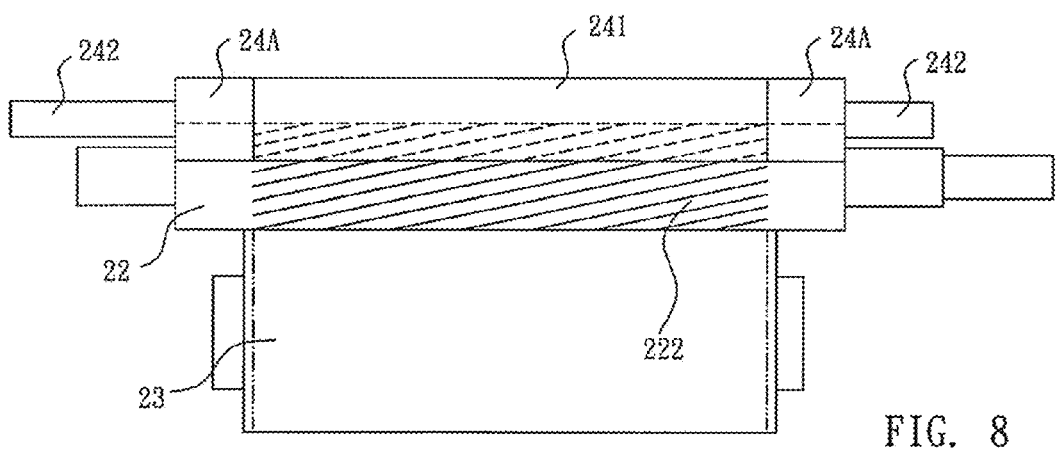
FIG. 8 is a top view of the pattern roller and the adjustment rollers.
Figure 10:
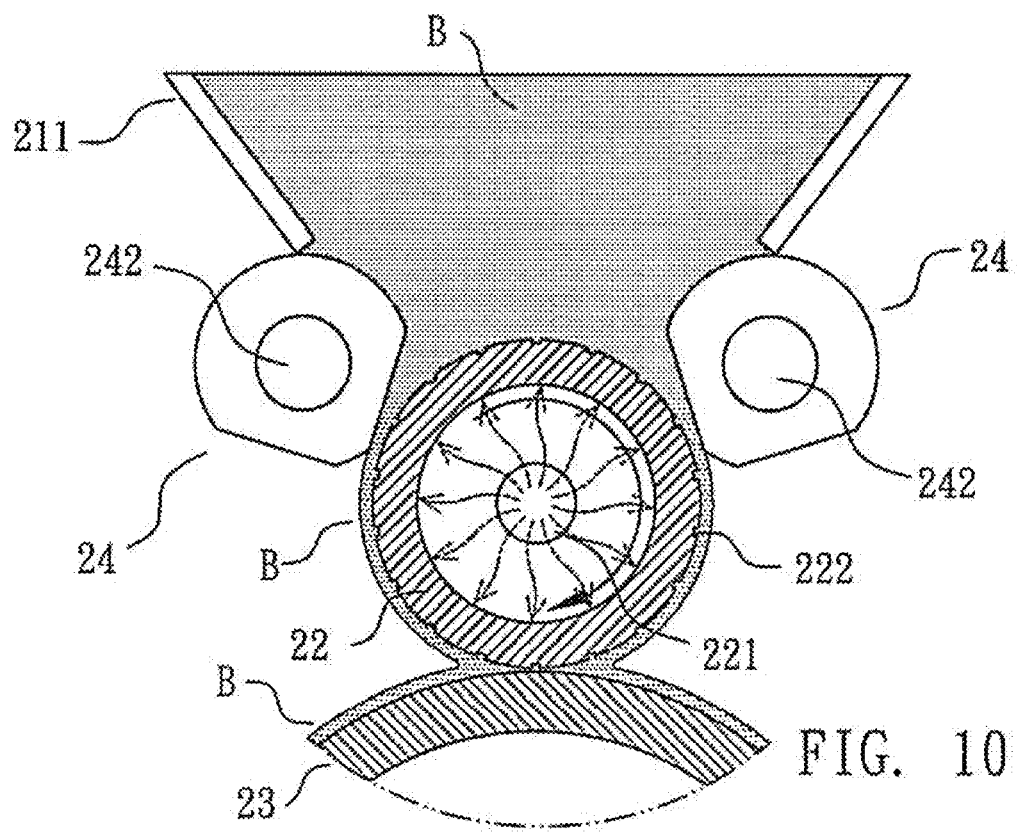
FIG. 10 is a longitudinal sectional view of the main portion of the adhesive coating device showing adhesive being discharged onto the resilient rollter.
Figure 11:
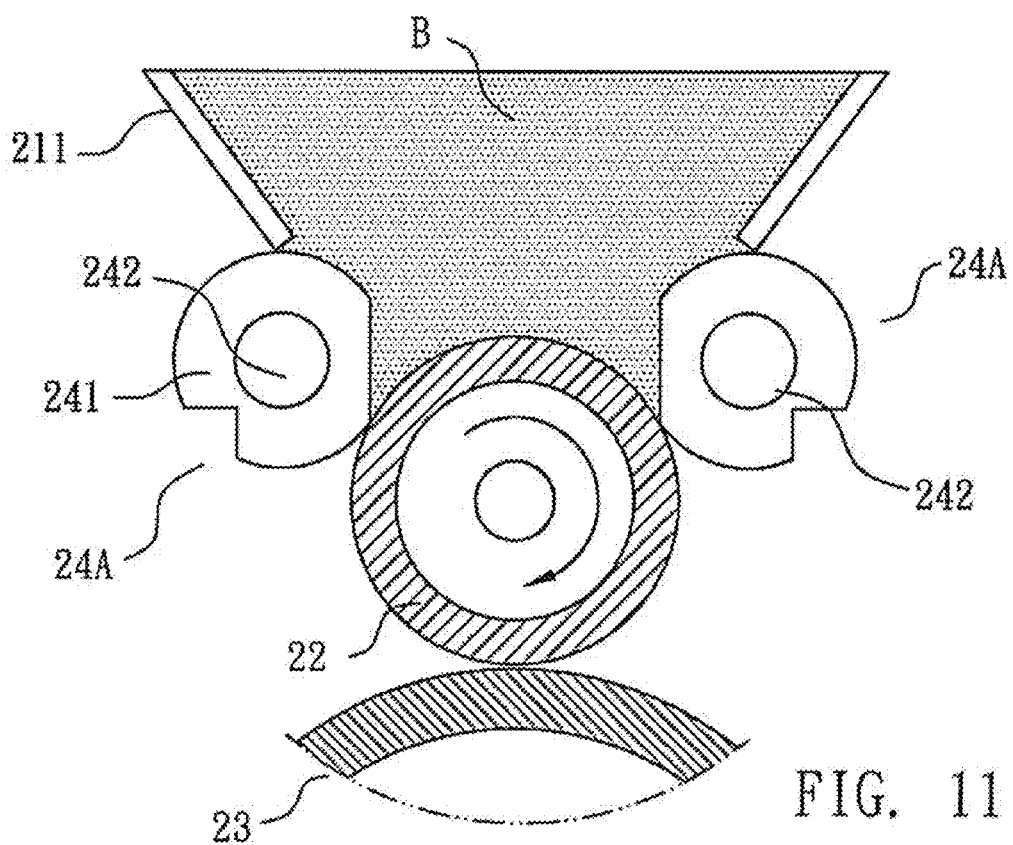
FIG. 11 is a view similar to FIG. 10 showing the discharge being stop.

Referring to FIGS. 1 to 19, an adhesive coating device 2 in accordance with the invention is mounted on a machine 1. The adhesive coating device 2 comprises the following components as discussed in detail below.

A base 21 includes two opposite end members 212, two opposite cooling members 28 provided on tops of the end members 212 respectively, and a reservoir 211 defined by the end members 212, the cooling members 28, and two sides. The reservoir 211 is adapted to contain a quantity of liquid adhesive B. Two opposite adjustment rollers 24 are provided at bottom ends of the end members 212. A pattern roller 22 includes an axial, hollow shaft 221 and a pattern 222 formed on its outer surface. The pattern 222 can be inclined lines (see FIG. 2A), straight lines (see FIG. 2B), or a net having a plurality of rhombs (see FIG. 2C). The adjustment roller 24 includes a scraping member 241, a shaft 242 through the scraping member 241, and two limit members 24A put on the shaft 242 and mounted on two ends of the scraping member 241 respectively.

There is a gap between the pattern roller 22 and either adjustment roller 24 and the gap is adjustable as detailed later. A resilient roller 23 has an axial hole 231. Two opposite holes 213 are provided on a lower portion of the base 21. Two fastening members 23B are provided on the outer mouths of the holes 213 respectively. A pivot 23A is driven through the holes 213 and the axial hole 231 and has both ends rotatably fastened by the fastening members 23B. As such, the resilient roller 23 is pivotably provided under the pattern roller 22 and is in close proximity thereto. A roller member 11 is rotatably secured to the machine 1 and is disposed under the resilient roller 23. Two links 25 are provided on one side of the base 21. The pivotal, co-rotated links 25 are operatively connected to the adjustment rollers 24 respectively. An upright adjustment screw 26 includes a torsion spring 261 put on and has a bottom end pivotably secured to one end of one link 25.

A baffle plate 27 is rotatably secured to the machine 1 and is parallel to the roller member 11. The baffle plate 27 can be pivoted to prevent a workpiece A from passing through a gap between the resilient roller 23 and the roller member 11 from being bent upward (see FIG. 14). Further, the baffle plate 27 can be pivoted clockwise (see FIG. 15) or counterclockwise (see FIG. 16). A support plate 3 is releasably mounted on the machine 1. A height adjustable clamp 12 is provided on the machine 1 and can be operated to fasten the support plate 3 or not (see FIGS. 5 and 6).

In a coating operation, adhesive B in the reservoir 211 flows through a gap between one adjustment roller 24 and the pattern roller 22 and a gap between the other adjustment roller 24 and the pattern roller 22 to spread on the pattern roller 22. And in turn, the adhesive B is brought from the pattern roller 22 to the resilient roller 23 with a predetermined pattern being brought thereon. Finally, the adhesive B is spread on a workpiece (e.g., shoe sole) A passing through a gap between the resilient roller 23 and the roller member 11 which has a rotating direction opposite to that of the resilient roller 23. The adhesive A coated with the predetermined pattern is formed on the workpiece A. A blower 4 is mounted in the machine 1 for supplying pressurized wind to the hollow shaft 221 for cooling purpose and to the surface of the resilient roller 23 so as to sufficiently cool the adhesive B spread thereon. Advantageously, a clockwise rotation of the adjustment screw 26 can rotate one link 25 which in turn rotates the other link 25 the same angle but different directions (e.g., clockwise and counterclockwise rotations). As such, the gap between the pattern roller 22 and either adjustment roller 24 is adjusted. It is understood that the wider of the gap the more of the adhesive B will be applied. As a result, thickness of the outer layer formed on the workpiece A can be adjusted depending on applications.

Figure 12A:
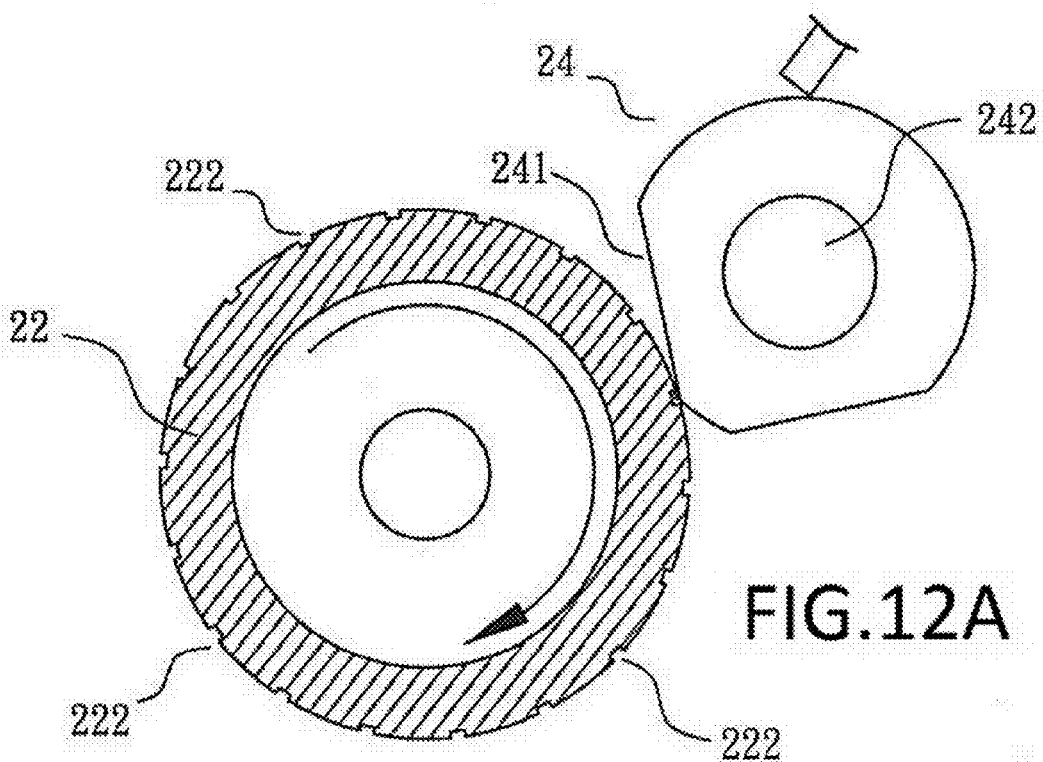
FIGS. 12A and 12B are fragmentary views of the pattern roller and the adjustment roller of FIG. 11 showing a residue removal operation after stopping the adhesive discharge.
Figure 12B:
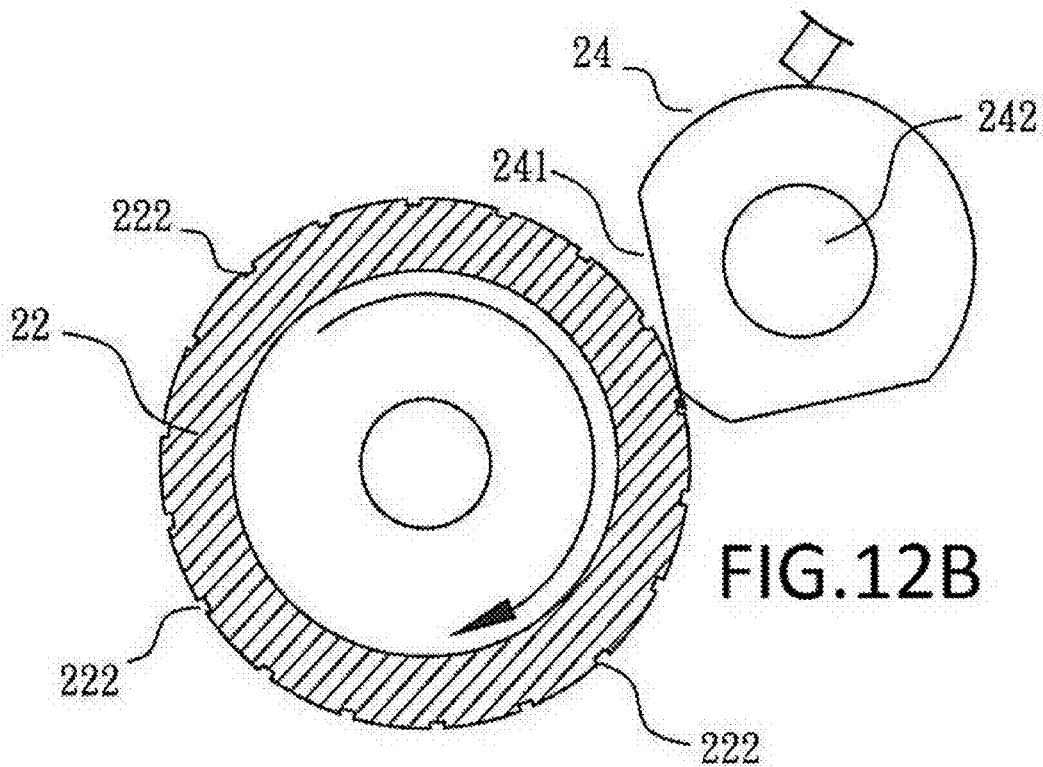
Figures 13A, 13B:
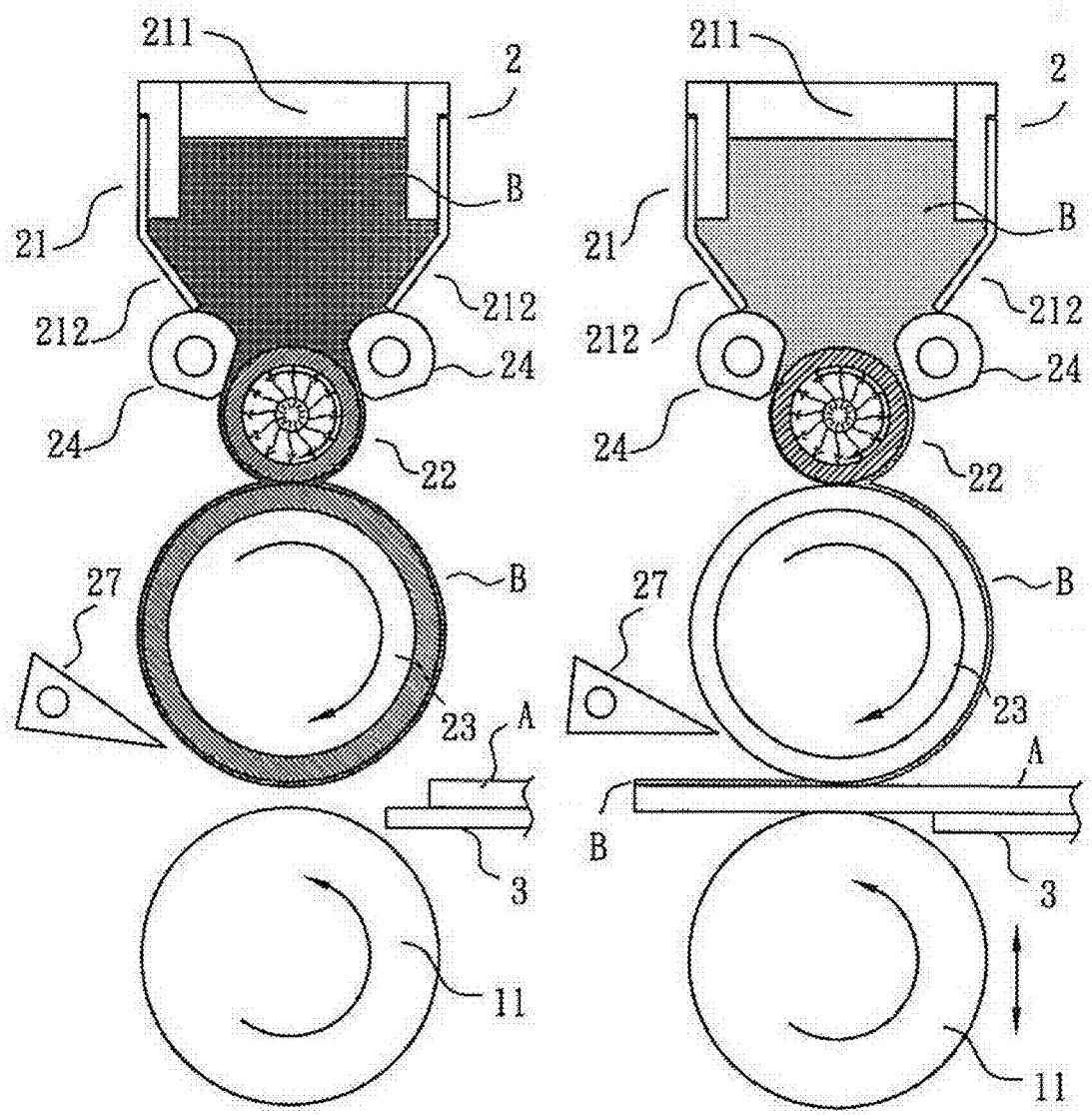
FIG. 13A is a longitudinal sectional view of the main portion of the adhesive coating device showing adhesive being coated on a workpiece.
FIG. 13B is a view similar to FIG. 13A showing a front end of the workpiece just passing a gap between resilient roller and roller member.
Figures 14, 15, 16:
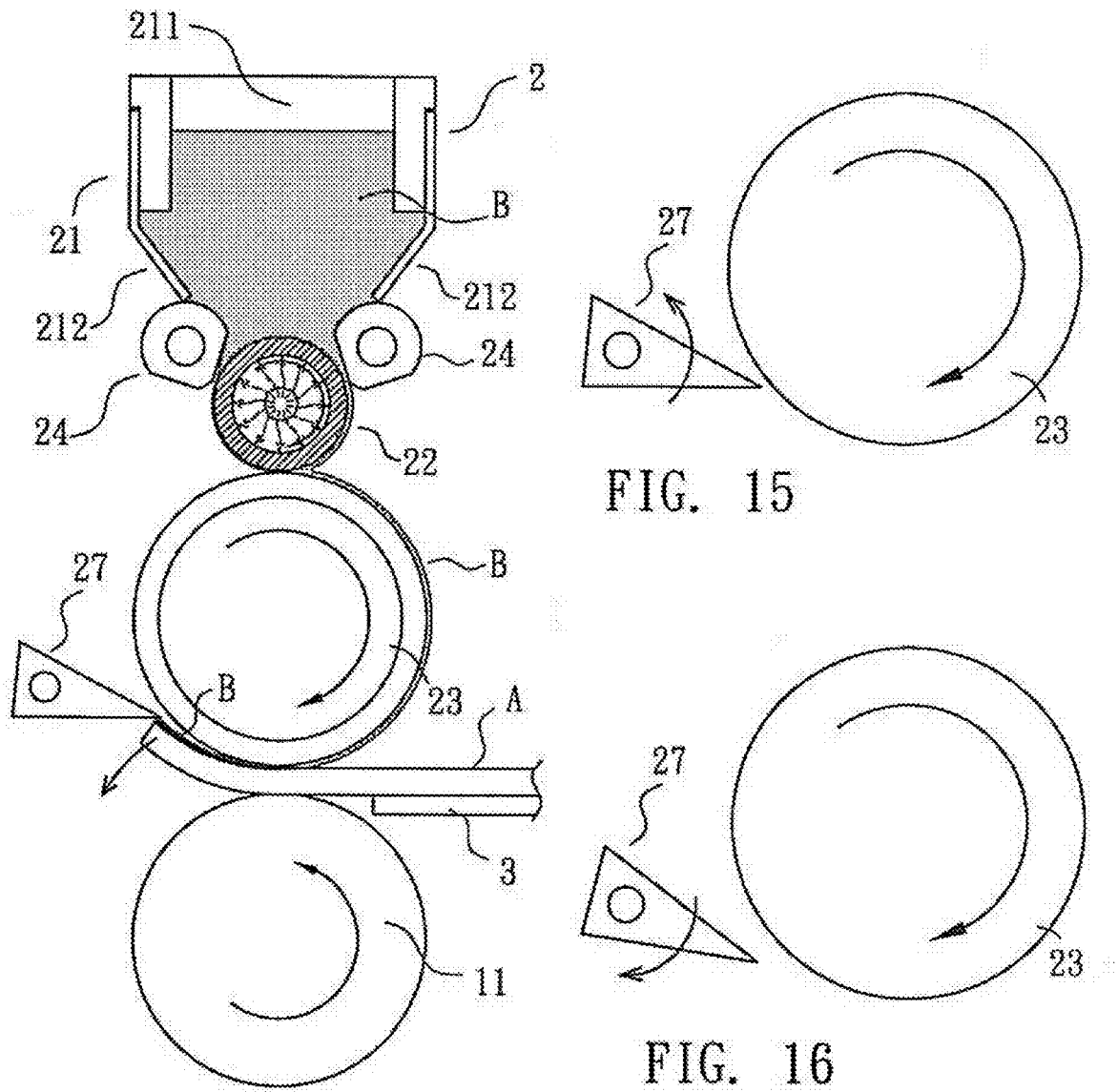
FIG. 14 is a view similar to FIG. 13B showing the front end of the workpiece being pushed down by the baffle plate.
FIGS. 15 and 16 are views of the intermediate portion of FIG. 14 showing counterclockwise and clockwise rotations of the baffle plate respectively.
Figure 17:
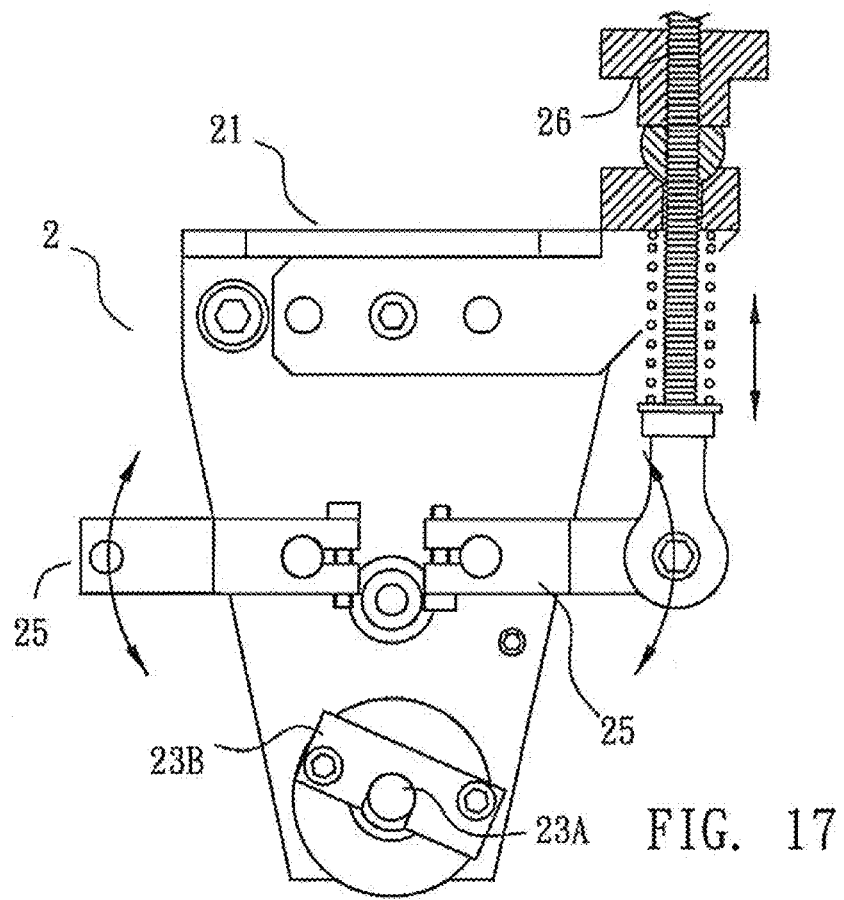
FIG. 17 is a side view in part section showing an adjustment of a distance between the adjustment roller and the pattern roller.
Figures 18, 19:
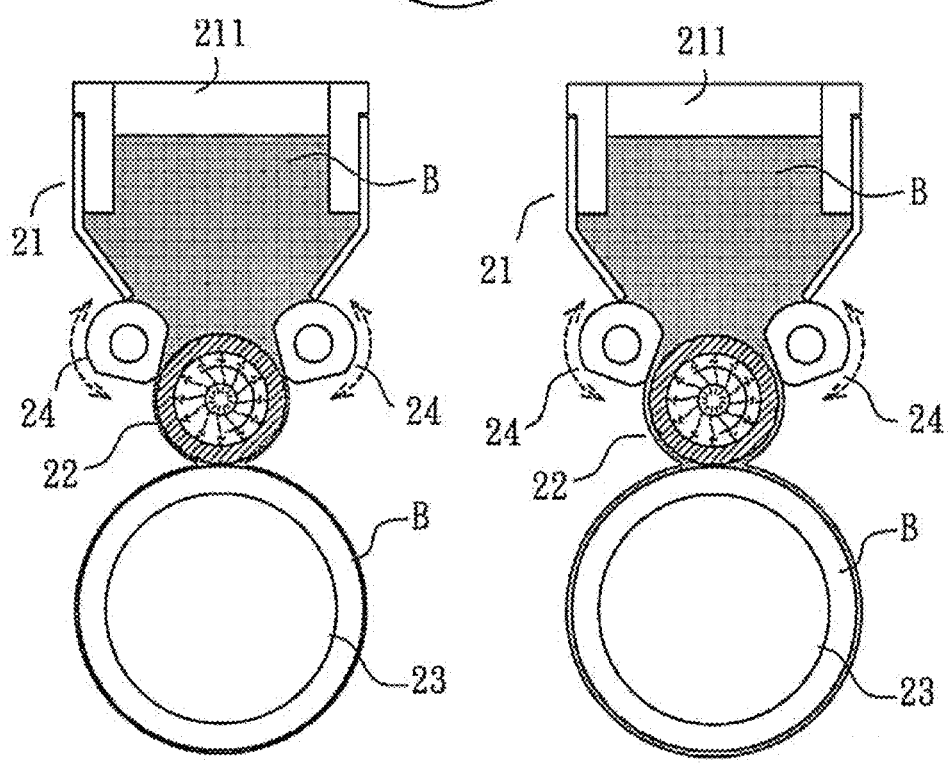
FIGS. 18 and 19 are longitudinal sectional views of the main portion of the adhesive coating device showing adhesive being coated on the workpiece and showing an adjustment of the amount of adhesive being applied by adjusting positions of the adjustment rollers respectively.

As shown in FIGS. 12A and 12B, the pattern roller 22 rotates clockwise so that the scraping member 241 can scrape remains from the pattern 222.

While the invention has been described in terms of preferred embodiments, those skilled in the art will recognize that the invention can be practiced with modifications within the spirit and scope of the appended claims.

What is claimed is:

1. An adhesive coating device comprising:
a reservoir for containing a quantity of adhesive;
opposite first and second adjustment rollers disposed at a bottom of the reservoir;
a pattern roller disposed between and spaced apart from the first and second adjustment rollers and having a predetermined pattern formed thereon;
a resilient roller disposed under the pattern roller;
a roller member disposed under the resilient roller;
pivotal, co-rotated first and second links disposed on a side of the reservoir and operatively connected to the first and second adjustment rollers respectively;
a spring biased adjustment screw having a bottom end pivotably secured to an end of the first link; and
each of the first and second adjustment rollers includes a scraping member, a shaft through the scraping member, and two limit members put on the shaft and mounted on two ends of the scraping member respectively;
wherein the adhesive in the reservoir is configured to flow through both a first gap between the first adjustment roller and the pattern roller and a second gap between the second adjustment roller and the pattern roller to spread on the pattern roller, the adhesive is brought from the pattern roller to the resilient roller with the predetermined pattern being printed on the adhesive on the resilient roller, and the adhesive is spread on a workpiece passing through a gap between the resilient roller and the roller member; and
wherein a clockwise rotation of the adjustment screw rotates the first link an angle and rotates the second link the same angle but at a different direction, thereby decreasing a gap between the pattern roller and each of the first and second adjustment rollers.

* * * * *